(No Model.)

G. L. HAGARTY.
FEED WATER HEATER.

No. 377,752. Patented Feb. 14, 1888.

ATTEST.
C. W. Russell.
B. F. Wheeler.

INVENTOR.
George L. Hagarty.
By Rasor B. Wheeler
atty.

UNITED STATES PATENT OFFICE.

GEORGE L. HAGARTY, OF ST. THOMAS, ONTARIO, CANADA, ASSIGNOR OF ONE-THIRD TO EDWIN S. DECKER, OF SAME PLACE.

FEED-WATER HEATER.

SPECIFICATION forming part of Letters Patent No. 377,752, dated February 14, 1888.

Application filed May 23, 1887. Serial No. 239,038. (No model.)

*To all whom it may concern:*

Be it known that I, GEORGE L. HAGARTY, a citizen of Canada, residing at St. Thomas, in the county of Elgin, Province of Ontario, Canada, have invented certain new and useful Improvements in Feed Water Heaters for Locomotives; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the means employed for heating or warming the feed-water of a locomotive prior to its entering the boiler.

The object of my invention is to heat the water to a boiling or steam-generating point before entering the boiler, to better enable the maintaining of a uniform steam-pressure in the boiler and to more rapidly generate steam therein; and my invention consists in passing the feed-water from each injector through an independent pipe coiled or passing around within the fire-box, then passing out and entering the mud-drum of the boiler, whereby I am able to utilize the ordinary heat of the fire-box for heating the water prior to its passage into the mud-drum, as hereinafter set forth, and pointed out particularly in the claim.

Figure 1:
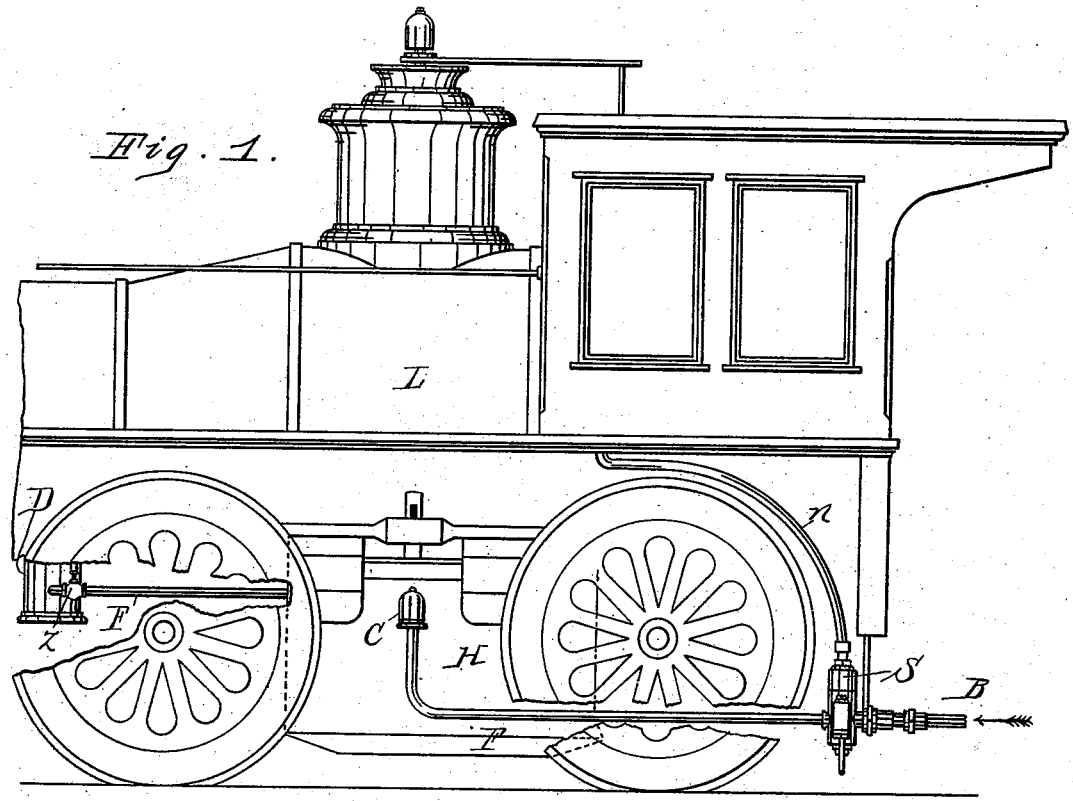
Figure 2:
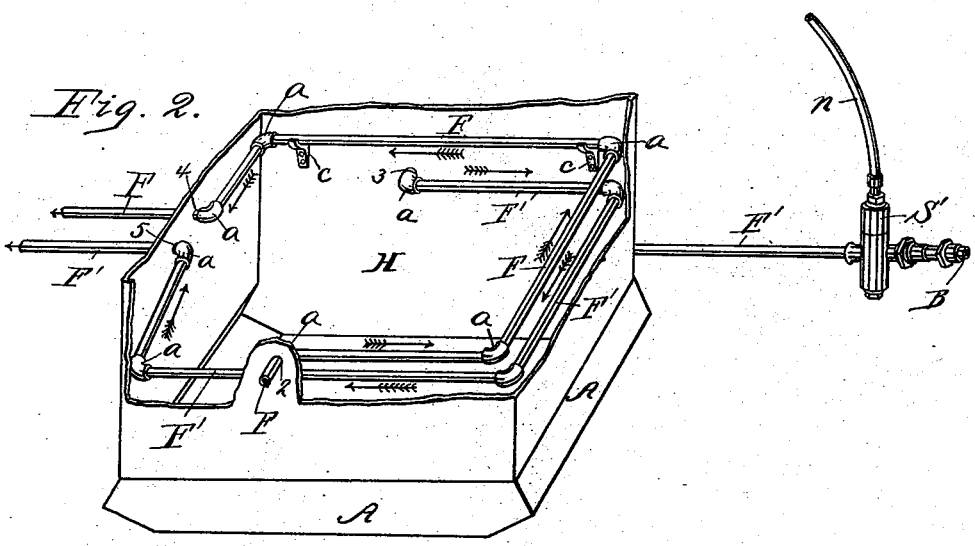

In the drawings forming a part of this specification, Figure 1 is a side elevation of a locomotive containing my invention. Fig. 2 is an isometrical view of the fire-box, having the upper portion broken away to show the connection of the water-feeding pipes, with the left-hand injector coupled to the feed-pipe at the left side of the locomotive.

As indicated in the drawings, L represents an ordinary locomotive; H, the fire-box, of usual construction; A, the ash-pan.

S is an injector located on the right-hand side of the locomotive, and S' is a like injector located on the left-hand side.

B is the feed-water pipes leading from the injectors to the tank of a locomotive. (The tank is not shown, as such will be understood by those skilled in the art.)

n is the steam-supply pipe for operating the injector S. Each injector has an independent supply-pipe.

F is a feed-water pipe coupled to the injector S, and, passing forward, is coupled to the check-valve C, then passing through the fire-box at 2, with an elbow, a, passes back along the fire-box, crossing the rear end, then along the opposite side, then along the front of the fire-box to near the center, passing out at 4, extending forward, enters the mud-drum D. At said point I locate a cut-off, Z. (See Figs. 1 and 2.) F' is a like feed-water pipe, which is coupled to the injector S', passing forward, enters the fire box at 3, and by an elbow, a, passes back along the fire-box, then along the end of the box, then forward along the side of the box, then along the front, passing out of the fire-box at 5, thence forward, enters the mud-drum D, at which point I also locate a cut-off, Z. The inflow of water to the boiler through each pipe is indicated by arrows in Fig. 2. By this arrangement the water flows from each injector nearly once around within the fire-box before entering the mud-drum in two streams, each injector forcing an independent stream. This construction enables the operator to supply the boiler with water should one of the injectors fail to work, and by dividing the supply in conveying it to the boiler the volume passing through each of the supply-pipes F F' is so small that it becomes rapidly warmed in passing around the fire-box and enables the using of comparatively small feeding-pipes, and each set of pipes may, if found necessary, pass two or more times around within the fire-box.

The cut-offs Z are to stop the flow of water from the boiler to prevent freezing in the pipes when the locomotive is idle, or in case the feeding-pipes need repairing or should leak.

C represents metal brackets, which I rivet to the inner face of the fire-box to properly support the feed-water pipes over the flames of the furnace, and are so constructed that the pipes may be readily raised to move them from the fire-box for repairs if desired.

Having thus fully set forth my invention, what I claim as new, and desire to secure by Letters Patent, is—

In combination with the fire-box, the injectors, the water-supply pipe leading to each injector, also the steam-supply pipes *n n*, and an independent water-supply pipe leading from each injector to and entering the fire-box, passing thence around within said fire-box, entering the mud-drum through the front of said fire-box, each supply-pipe having a valve, C, and a cut-off, Z, said pipes within the fire-box being detachably supported on the brackets *c*, substantially as and for the purposes set forth.

In testimony whereof I affix my signature in presence of two witnesses.

GEORGE L. HAGARTY.

Witnesses:
E. S. DECKER,
R. B. WHEELER.